(12) United States Patent
Cornelius

(10) Patent No.: US 7,574,447 B2
(45) Date of Patent: Aug. 11, 2009

(54) INBOUND PACKAGE TRACKING SYSTEMS AND METHODS

(75) Inventor: John Cornelius, Roswell, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 460 days.

(21) Appl. No.: 10/409,688

(22) Filed: Apr. 8, 2003

(65) Prior Publication Data
US 2004/0215588 A1    Oct. 28, 2004

(51) Int. Cl.
*G06F 17/00* (2006.01)
(52) U.S. Cl. .............................. 707/102; 707/9; 707/10; 707/101; 707/103 Y; 707/104.1; 235/384; 705/6; 705/28
(58) Field of Classification Search ................. 705/22, 705/1, 6, 26, 28, 37, 407; 707/1, 2, 3, 4, 707/10, 100, 102, 104.1, 101, 103 X, 103 R, 707/9, 103 Y; 700/213; 709/219; 235/384
See application file for complete search history.

(56) References Cited

U.S. PATENT DOCUMENTS

| | | | |
|---|---|---|---|
| 4,799,156 A | 1/1989 | Shavit et al. .................. 705/26 |
| 5,153,842 A | 10/1992 | Diugos, Sr. et al. ......... 700/227 |
| 5,375,240 A | 12/1994 | Grundy ...................... 713/200 |
| 5,452,203 A | 9/1995 | Moore ........................ 707/200 |
| 5,631,827 A | 5/1997 | Nicholls et al. ............... 705/28 |
| 5,905,666 A | 5/1999 | Hoffman et al. .............. 700/99 |
| 5,978,792 A | 11/1999 | Bhargava et al. ............... 707/2 |
| 6,006,200 A * | 12/1999 | Boies et al. .................... 705/26 |
| 6,047,264 A | 4/2000 | Fisher et al. .................. 705/28 |
| 6,131,101 A | 10/2000 | Maitino et al. .............. 707/201 |
| 6,205,447 B1 | 3/2001 | Malloy ....................... 707/102 |
| 6,208,980 B1 | 3/2001 | Kara ........................... 705/408 |
| 6,220,509 B1 | 4/2001 | Byford ....................... 235/375 |
| 6,236,972 B1 | 5/2001 | Shkedy ......................... 705/1 |

(Continued)

FOREIGN PATENT DOCUMENTS

EP     1 197 885 A2    12/2001

(Continued)

OTHER PUBLICATIONS

De Marco, Donna, E-Tail Presents Can Be Tougher to Send Back Than Order, Journal, Dec. 28, 1999, Downloaded from the Internet on Oct. 3, 2002, Accession No. 08891512, Knight-Ridder/Tribune Business News, The Dialog Corporation, United States.

(Continued)

*Primary Examiner*—Thuy N Pardo
(74) *Attorney, Agent, or Firm*—Alston & Bird LLP

(57) ABSTRACT

The present invention discloses systems and methods for tracking packages inbound to a user. One embodiment of the invention discloses a process by which shipping information is analyzed to determine the various ways in which shippers have previously identified a consignee location. A consignee alias table is generated that lists the various combinations of consignee name and address used by shippers to identify the consignee location. Package level detail is then received from a carrier and compared against a consignee alias database to identify packages that are inbound to the consignee location, and a consignee location table is updated that monitors the status and anticipated delivery date of all packages inbound to the consignee location.

6 Claims, 12 Drawing Sheets

U.S. PATENT DOCUMENTS

| | | | |
|---|---|---|---|
| 6,285,916 B1 | 9/2001 | Kadaba et al. | 705/28 |
| 6,343,275 B1 | 1/2002 | Wong | 705/26 |
| 6,356,196 B1 | 3/2002 | Wong et al. | 340/571 |
| 6,405,203 B1* | 6/2002 | Collart | 707/10 |
| 6,439,783 B1 | 8/2002 | Antoshenkov | 707/3 |
| 6,457,012 B1 | 9/2002 | Jatkowski | 707/101 |
| 6,463,420 B1 | 10/2002 | Guidice et al. | 705/28 |
| 6,466,948 B1* | 10/2002 | Levitsky et al. | 707/104.1 |
| 6,487,549 B1 | 11/2002 | Amundsen | 707/3 |
| 6,502,089 B1 | 12/2002 | Amundsen et al. | 707/2 |
| 6,507,835 B1 | 1/2003 | Amundsen et al. | 707/3 |
| 6,539,360 B1 | 3/2003 | Kadaba | 705/28 |
| 6,564,204 B1 | 5/2003 | Amundsen et al. | 707/2 |
| 6,571,213 B1* | 5/2003 | Altendahl et al. | 705/1 |
| 6,575,376 B2 | 6/2003 | Yu | 235/375 |
| 6,785,718 B2* | 8/2004 | Hancock et al. | 709/219 |
| 6,889,194 B1* | 5/2005 | Kadaba | 705/1 |
| 6,917,924 B1* | 7/2005 | Ramsden et al. | 705/407 |
| 2001/0043599 A1 | 11/2001 | Redmond | 370/390 |
| 2001/0054031 A1 | 12/2001 | Lee et al. | 705/406 |
| 2002/0010634 A1 | 1/2002 | Roman et al. | 705/28 |
| 2002/0013744 A1 | 1/2002 | Tsunenari et al. | 705/28 |
| 2002/0016726 A1 | 2/2002 | Ross | 705/7 |
| 2002/0019761 A1 | 2/2002 | Lidow | 705/10 |
| 2002/0032612 A1 | 3/2002 | Williams et al. | 705/26 |
| 2002/0073039 A1 | 6/2002 | Ogg et al. | 705/60 |
| 2002/0078024 A1 | 6/2002 | Bellamy et al. | 707/1 |
| 2002/0124015 A1 | 9/2002 | Cardno et al. | 705/204 |
| 2002/0133434 A1* | 9/2002 | Nevel et al. | 705/28 |
| 2002/0143670 A1* | 10/2002 | Cushing et al. | 705/28 |
| 2002/0153409 A1 | 10/2002 | Yu | 235/375 |
| 2002/0174148 A1 | 11/2002 | Seidman | 715/517 |
| 2003/0004830 A1* | 1/2003 | Frederick | 705/26 |
| 2003/0009396 A1* | 1/2003 | DeVries et al. | 705/28 |
| 2003/0074213 A1 | 4/2003 | Murakami et al. | 705/1 |
| 2003/0105704 A1* | 6/2003 | Sundel | 705/37 |
| 2003/0144871 A1* | 7/2003 | Turbeville et al. | 705/1 |
| 2003/0236688 A1* | 12/2003 | Kadaba et al. | 705/6 |
| 2004/0093222 A1* | 5/2004 | Sipe et al. | 705/1 |
| 2004/0134982 A1* | 7/2004 | Jouvin et al. | 235/384 |
| 2004/0148052 A1* | 7/2004 | Ferguson et al. | 700/213 |
| 2004/0153379 A1* | 8/2004 | Joyce et al. | 705/28 |
| 2004/0199495 A1* | 10/2004 | Colbath et al. | 707/3 |

FOREIGN PATENT DOCUMENTS

| | | | |
|---|---|---|---|
| JP | 408323299 A | 12/1996 | |
| WO | WO-96/34354 | 10/1996 | |
| WO | WO-96/38800 | 12/1996 | |
| WO | WO 00/30014 A1 | 5/2000 | |
| WO | WO 00/46726 | 8/2000 | |
| WO | WO 00/46728 | 8/2000 | |
| WO | WO 01/16889 A1 | 3/2001 | |
| WO | WO 01/29778 A1 | 4/2001 | |
| WO | WO 01/35344 A2 | 5/2001 | |
| WO | WO 01/65454 A2 | 9/2001 | |
| WO | WO 01/67344 A1 | 9/2001 | |
| WO | WO 01/72109 A2 | 10/2001 | |
| WO | WO 01/88831 A2 | 11/2001 | |
| WO | WO 02/07104 A1 | 1/2002 | |
| WO | WO 02/17045 A2 | 2/2002 | |
| WO | WO 02/052378 A2 | 7/2002 | |

OTHER PUBLICATIONS

Harrington, Lisa, The U.S. Postal Service Gets Serious About Serving Business in the New Economy, Journal, May 2000, Downloaded from the Internet on Oct. 3, 2002, p. 2, vol. 41, No. 5, Accession No. 01167257, Penton Publishing, Inc., United States of America.

Henderson, Timothy, Buy.com Boosts Returns Process Efficiency With New Solution, Periodical, Nov. 2000, Downloaded from the Internet on Oct. 3, 2002, pp. 72-76, vol. 82n11, Accession No. 02102731, ProQuest Info&Learning, United States of America.

Many Happy Returns—UPS Unvels Advanced Outline Returns Solution, Journal, Sep. 20, 2000, Downloaded from the Internet on Oct. 3, 2002, Accession No. 12921102, Business Wire, United States of America.

El Portal del Transporte, FedEx Insight Empowers Customers with Enhanced Shipment Visibility and Control, Article, Apr. 11, 2001 (Retrieved on Apr. 25, 2003), p. 9, Paragraph 4—p. 10, Line 7, Retrieved from the Internet: <URL:http://www.transportando.net/newsabril_completa.htm>.

Pender, Lee, Hard Times Are The Best Times, Magazine, Aug. 15, 2001 (Retrieved on Apr. 25, 2003), p. 3, Paragraph 3, Retrieved from the Internet: <URL:http://www.cio.com/archive/081501/besttimes_content.html>.

Frontline Solutions, FedEx Improves Internal, External Operations, Article, Apr. 5, 2001 (Retrieved from the Internet Apr. 25, 2003), p. 1 (last line) through p. 2, Paragraph 9, Retrieved from the Internet: <URL:http://www.frontlinemagazine.com/art_th/o4052001.htx>, Fairfax, Virginia and Memphis, Tennessee.

Brewin, Bob and Rosencrance, Linda, Follow That Package!, Article, Mar. 19, 2001 (Retrieved from the Internet Apr. 25, 2003), p. 1-p. 5, Retrieved from the Internet: URL:http://www.computerworld.com./printthis/2001/0,4814,58696,00.html, Computer World.

Van Huzien, Gordon, Messaging: The Transport Part of The XML Puzzle, Article, Jul. 2000 (Retrieved from the Internet Apr. 25, 2003:<URL:http://www-106.ibm.com/developerworks/library/xml-messaging/22 .

* cited by examiner

| UniqueNameAddress | | | | | |
|---|---|---|---|---|---|
| LocationName | ConsigneeName1 | ConsigneeAddress1 | ConsigneeCity | ConsigneeState | ConsigneePostalCode |
| Campellsville | | | | | |
| | AMAZON | 1050 S COL | CAMPBELLSVILLE | KY | 42718 |
| | AMAZON COM 631757X | ATTN RECEIVING | CAMPBELLSVILLE | KY | 42718 |
| | AMAZON COM KYDC INC 3175 | 1050 SOUTH COLUMBIA AVE | CAMPBELLSVILLE | KY | 42718 |
| | AMAZON COM | 1050 S COLUMBIA AVE | CAMPBELLSVILLE | KY | 42718 |
| | AMAZON COM | 1050 SOUTH COLUMBIA | CAMPBELLSVILLE | KY | 42718 |
| | AMAZON COM KYDC INC | 1050 SOUTH COLUMBIA AVE | CAMPBELLSVILLE | KY | 427182454 |
| | AMAZON COM KYDC INC | 1050 SOUTH COLUMBIA | CAMPBELLSVILLE | KY | 427182454 |
| | AMAZON COM KYDC INC | 1050 SOUTH COLUMBIA | CAMPBELLSVILLE | KY | 42718 |
| Coffeyville | | | | | |
| | AMAZON COM KSDC INC | 1 AMAZON WAY | COFFEYVILLE | KS | 67337 |
| | AMAZON COM 6317545 | ATTN MEDIA RECEIVE | COFFEYVILLE | KS | 67337 |
| | AMAZON COM | 2654 N HIGHWAY 169 ONE AM | COFFEYVILLE | KS | 67337 |
| | AMAZON COM KSDC INC | COFFEYVILLE INDUSTRIAL PA | COFFEYVILLE | KS | 673379235 |
| | AMAZON COM KSDC INC | 2654 N HIGHWAY 169 | COFFEYVILLE | KS | 67337 |
| Fernley | | | | | |
| | AMAZON COM 566008 | 1600 EAST NEWLANDS DRIVE | FERNLEY | NV | 89408 |
| | AMAZON COM | 1600 NEWLANDS DR E | FERNLEY | NV | 89408 |
| | AMAZON COM | 1600 EAST NEWLANDS DRIVE | FERNLEY | NV | 89408 |
| | AMAZON COM INC | MEDIA RECEIVE | FERNLEY | NV | 894088903 |
| | AMAZON COM | 1600 EAST NEWLANDS DRIVE | FERNLEY | NV | 894088903 |
| | AMAZON COM 1566008 | ATTN MEDIA RECEIVE | FERNLEY | NV | 89408 |
| Lexington | | | | | |
| | AMAZON COM ADVANTAGE | 1850 MERCER DR | LEXINGTON | KY | 40511 |
| | AMAZON COM INC | SPECIAL RECEIVE | LEXINGTON | KY | 40511 |
| | AMAZON COM ADVANTAGE D | 1850 MERCER DR | LEXINGTON | KY | 40511 |

FIG. 2A

| LocationName | ConsigneeName1 | ConsigneeAddress1 | ConsigneeCity | ConsigneeState | ConsigneePostalCode |
|---|---|---|---|---|---|
|  | AMAZON COM 6317480 | ATTN MEDIA RECEIVE | LEXINGTON | KY | 40511 |
|  | AMAZON ADVANTAGE DC | 1850 MERCER DRIVE | LEXINGTON | KY | 40511 |
|  | AMAZON COM | 1850 MERCER ROAD | LEXINGTON | KY | 40511 |
|  | AMAZON COM | 1850 MERCER DRIVE | LEXINGTON | KY | 40511 |
|  | AMAZON COM | 1850 MERCER DR | LEXINGTON | KY | 40511 |
|  | AMAZON COM ADVANTAGE DC | 1850 MERCER DR | LEXINGTON | KY | 40511 |
|  | AMAZON COM ADVANTAGE DC | 1850 MERCER DRIVE | LEXINGTON | KY | 40511 |
|  | AMAZON COMM KYDC INC | 1850 MERCER DRIVE | LEXINGTON | KY | 40511 |
|  | AMAZON COM ADVANTAGE KY | 1850 MERCER DR | LEXINGTON | KY | 40511 |
|  | AMAZON COM RECEIVING | 1850 MERCER RD | LEXINGTON | KY | 40511 |
|  | AMAZON COM KYDC INC 3174 | 1850 MERCER DRIVE | LEXINGTON | KY | 40511 |
|  | AMAZON COM KYDC INC | SPECIAL RECEIVE | LEXINGTON | KY | 40511 |
|  | AMAZON COM KYDC INC | SPECIAL RECEIVE | LEXINGTON | KY | 40511 |
|  | AMAZON COM KYDC INC | 1850 MERCER DRIVE | LEXINGTON | KY | 405111013 |
|  | AMAZON COM KYDC INC | 1850 MERCER DR | LEXINGTON | KY | 405111013 |
|  | AMAZON COM KYDC INC | 1850 MERCER DR | LEXINGTON | KY | 40511 |
|  | AMAZON COM KYDC | SPECIAL RECEIVE PO 8316244 | LEXINGTON | KY | 40511 |
|  | AMAZON COM KY DIST CENTE | 1850 MERCER DR | LEXINGTON | KY | 40511 |
|  | AMAZON COM ADVANTAGE | 1850 MERCER DRIVE | LEXINGTON | KY | 40511 |
|  | AMAZON COM INC | 1850 MERCER DRIVE | LEXINGTON | KY | 40511 |
|  | AMAZON COM RETURNS | 1850 MERCER RD | LEXINGTON | KY | 40511 |
|  | AMAZON COM ADVANTAGE DC | REF U0188719 | LEXINGTON | KY | 40511 |
|  | AMAZON COM ADVANTAGE DC | 1850 MERCER DR | LEXINGTON | KY | 40511 |
|  | AMAZON COM ADVANTAGE DC | SPECIAL RECV | LEXINGTON | KY | 40511 |
|  | AMAZON COM ADVANTAGE DC | SHIPPING ID R1133019 | LEXINGTON | KY | 40511 |
|  | AMAZON COM ADVANTAGE DC | SHIPPING ID R5970691 | LEXINGTON | KY | 40511 |
|  | AMAZON COM ADVANTAGE DC | SHIPPING ID K6396797 | LEXINGTON | KY | 40511 |
|  | AMAZON COM ADVANTAGE DC | 1850 MERCER DRIVE | LEXINGTON | KY | 40511 |
|  | AMAZON COM ADVANTAGE DC | ID S5231219 | LEXINGTON | KY | 40511 |

FIG. 2B

| LocationName | ConsigneeName1 | ConsigneeAddress1 | ConsigneeCity | ConsigneeState | ConsigneePostalCode |
|---|---|---|---|---|---|
|  | AMAZON COM ADVANTAGE DC | REF K5314697 | LEXINGTON | KY | 40511 |
| NewCastle |  |  |  |  |  |
|  | AMAZON | 1 CENTERPOINT BLVD | NEW CASTLE | DE | 19720 |
|  | AMAZON | 1 CENTERPOINT BLVD | NEW CASTLE | DE | 19720 |
|  | AMAZON COM INC | SPECIAL RECEIVE | NEW CASTLE | DE | 19720 |
|  | AMAZON COM | 1 CENTERPOINT BLVD | NEW CASTLE | DE | 19720 |
|  | AMAZON COM DEDC INC | SPECIAL RECEIVE | NEW CASTLE | DE | 19720 |
|  | AMAZON COM | 1 CENTERPOINT BLVD | NEW CASTLE | DE | 19720 |
|  | AMAZON COM INC | DELAWARE DISTRIBUTION CE | NEW CASTLE | DE | 197204172 |
|  | AMAZON COM 1553992 | ATTN MEDIA RECEIVE | NEW CASTLE | DE | 19720 |
|  | AMAZON COM | 1 CENTERPOINT BLVD | NEW CASTLE | DE | 197204172 |

FIG. 2C

| ups | UPS FullView™ | |
|---|---|---|

Home
Amazon Inbound                                                                                     amazon.com
Location: All Change Location     ⟵ 100
   Select Schedule Delivery Date:
   | 3/27/2003 ▼ | Update                                       115
   Shipments to ALL LOCATIONS scheduled for delivery on 3/24/2003
   A summary of inbound Shipments to each receiving locations is below. View inbound shipments by shipper.

| Location Name | City | State | Number of Packages | Total Weight |
|---|---|---|---|---|
| Campbellsville | 1050 SOUTH COLUMBIA | CAMPBELLSVILLE | 21 | 186 Lbs. |
| Coffeyville | 2654 N HIGHWAY 169 ONE AMAZON WAY | COFFEYVILLE | 45 | 632 Lbs. |
| Fernley  ⟵120 | 1600 EAST NEWLANDS DRIVE | FERNLEY | 24 | 185 Lbs. |
| Lexington | 1850 Mercer DR | LEXINGTON | 34 | 445 Lbs. |
| NewCastle | DELAWARE DISTRIBUTION CENTER | NEW CASTLE | 41 | 577 Lbs. |

FIG. 7A

| | UPS FullView™ | |
|---|---|---|

Home  
Amazon Inbound                                                                                           amazon.com Location: All Locations  Change Location
   Select Schedule Delivery Date:
   [3/21/2003    ▼]  Update
   Shipper: NAVARE CORP, 7400 49TH AVE N, NEW HOPE MN, 55428 4258
   A summary of inbound Shipments from this shipper is below.

| No. | Location | Tracking number | Reference Number 1 | Ship Date | Origin | Exception | Destination | Delivered | Service | Weight |
|---|---|---|---|---|---|---|---|---|---|---|
| 1 | Campbellsville | 1255274203469742710 | 2668762 | 3/20/2003 | 3/20/2003 | 0 | 0 | 0 | UPS Ground | 9 Lbls. |
| 2 | Campbellsville | 1255274203469720220 | 2669532 | 3/20/2003 | 3/20/2003 | 0 | 0 | 0 | UPS Ground | 4 Lbls. |
| 3 | Campbellsville | 1255274203469720950 | 2668761 | 3/20/2003 | 3/20/2003 | 0 | 0 | 0 | UPS Ground | 9 Lbls. |
| 4 | Campbellsville | 1255274203469721480 | 2668761 | 3/20/2003 | 3/20/2003 | 0 | 0 | 0 | UPS Ground | 9 Lbls. |
| 5 | Campbellsville | 1255274203469740840 | 2668764 | 3/20/2003 | 3/20/2003 | 0 | 0 | 0 | UPS Ground | 4 Lbls. |
| 6 | Campbellsville | 1255274203469741910 | 2669527 | 3/20/2003 | 3/20/2003 | 0 | 0 | 0 | UPS Ground | 8 Lbls. |
| 7 | Campbellsville | 1255274203469742170 | 2668762 | 3/20/2003 | 3/20/2003 | 0 | 0 | 0 | UPS Ground | 4 Lbls. |
| 8 | Campbellsville | 1255274203469742350 | 2668762 | 3/20/2003 | 3/20/2003 | 0 | 0 | 0 | UPS Ground | 9 Lbls. |
| 9 | Campbellsville | 1255274203469707020 | 2668763 | 3/20/2003 | 3/20/2003 | 0 | 0 | 0 | UPS Ground | 10 Lbls. |
| 10 | Campbellsville | 1255274203469742620 | 2668762 | 3/20/2003 | 3/20/2003 | 0 | 0 | 0 | UPS Ground | 9 Lbls. |
| 11 | Campbellsville | 1255274203469819320 | 2671023 | 3/20/2003 | 3/20/2003 | 0 | 0 | 0 | UPS Ground | 6 Lbls. |
| 12 | Campbellsville | 1255274203469742800 | 2668762 | 3/20/2003 | 3/20/2003 | 0 | 0 | 0 | UPS Ground | 9 Lbls. |
| 13 | Campbellsville | 1255274203469743060 | 2668762 | 3/20/2003 | 3/20/2003 | 0 | 0 | 0 | UPS Ground | 9 Lbls. |

| 14 | Campbellsville | 1Z55274203469743240 | 2668762 | 3/20/2003 | 3/20/2003 | 0 | 0 | 0 | UPS Ground | 9 Lbls. |
| 15 | Campbellsville | 1Z55274203469743600 | 2669762 | 3/20/2003 | 3/20/2003 | 0 | 0 | 0 | UPS Ground | 9 Lbls. |
| 16 | Campbellsville | 1Z55274203469743920 | 2668762 | 3/20/2003 | 3/20/2003 | 0 | 0 | 0 | UPS Ground | 9 Lbls. |
| 17 | Campbellsville | 1Z55274203469744130 | 2668762 | 3/20/2003 | 3/20/2003 | 0 | 0 | 0 | UPS Ground | 9 Lbls. |
| 18 | Campbellsville | 1Z55274203469766080 | 2669536 | 3/20/2003 | 3/20/2003 | 0 | 0 | 0 | UPS Ground | 6 Lbls. |
| 19 | Campbellsville | 1Z55274203469742440 | 2668762 | 3/20/2003 | 3/20/2003 | 0 | 0 | 0 | UPS Ground | 9 Lbls. |

INBOUND PACKAGE TRACKING SYSTEMS AND METHODS

FIELD OF THE INVENTION

Systems and methods are disclosed for tracking packages that are inbound to a location and for forecasting when and how many packages will arrive on a given day.

BACKGROUND OF THE INVENTION

Package tracking is an integral part of a package delivery service that allows a customer to track goods that they have shipped or that have been shipped to them. The advent of the Internet has allowed commercial carriers such as the United Parcel Service (UPS) to make it possible for customers to track their shipments online using a web-based service. Some businesses have taken package tracking a step further and integrated the package tracking functionality into their internal business systems. Businesses thus have the ability to trigger business events based upon shipment status information received from a commercial carrier.

For the most part, package tracking services known in the art operate on an package by package basis and require that a customer query a carrier database with a package tracking number associated with the package to be tracked. As a result, it is difficult for a company with a heavy volume of inbound or outbound shipping to track all its packages currently in transit. Companies are often stuck with the burdensome task of individually tracking large numbers of packages or risk being surprised when an abnormally large number of packages arrives at its loading docks with insufficient help to dispatch it. The inbound tracking of packages is especially difficult as consignees often do not have ready access to the tracking numbers that are assigned to packages shipped to them. An unsatisfied need therefore exists in the industry for inbound package tracking methods and systems that overcomes this and other problems.

Inbound package tracking, that is, the ability to forecast what packages will be delivered to a particular location on a particular day can be especially valuable to businesses. If a business knows which packages are scheduled to arrive at which locations for a given day, that information can improve the inventory management and planning of the business, allow it to sell goods that are in transit from a vendor or a supplier, allow for the efficient allocation of production and receiving staff based on incoming shipment volume, and reduce the time spent tracking individual packages.

Several methods have been used by commercial carriers in an attempt to provide inbound package tracking information services. UPS offers a service known as Quantum View to those customers who want inbound visibility package tracking but who do not want to track packages on an individual basis. To use the Quantum View service, consignees identify one or more locations for which they want inbound visibility and assign a unique identifier, known as a Location Identifier (LID) to each identified location. The consignee then provides the LID to each of the vendors and suppliers that ship to the locations and instructs the vendors and suppliers to include the LID in the package detail information anytime that they ship a package to one of the identified locations (one shipper shipping to 15 different locations for consignee "XYZ" must change its shipping system to generate 15 different LIDs, as each LID is a unique to each consignee location). When UPS receives a package from one of these vendors or suppliers, UPS captures the LID from the electronic package manifest detail information that accompanies the shipment and uses the LID to identify that package as bound for a particular location. Using forecasting and delivery tables and methods that are well known in the art, UPS can forecast when the package will arrive at its destination and update a database of packages bound for the location. In this way, UPS provides a database to its customer that identifies the packages that are bound to a particular location and estimates the date of delivery for each inbound package.

This approach to inbound visibility tracking requires that the shipper include a LID in the package detail for each package shipped to the consignee. Vendors often use off-the-shelf shipping systems and may not be able to readily modify their shipping systems to accommodate a consignee's request that a LID be added to the package detail for packages bound to a consignee location, or the vendor may simply refuse the consignee request. Further, even assuming that a consignee can persuade its most frequently used vendors and suppliers to modify their shipping systems to use LIDs, the system captures only those packages shipped from these identified vendors and suppliers; packages that are inbound to the consignee from other shippers are not captured by the system. A need therefore exists for an inbound package tracking system that tracks packages without requiring a special identifier that marks the package for inbound tracking.

An unsatisfied need therefore exists in the industry for inbound package tracking methods and systems that overcome the above-identified and other problems.

SUMMARY OF THE INVENTION

The present invention discloses systems and methods for tracking packages inbound to a user. One embodiment of the invention discloses a process by which shipping information is analyzed to determine the various ways in which shippers have previously identified a consignee location. A consignee alias table is generated that lists the various combinations of consignee name and address used by shippers to identify the consignee location. Package level detail is then received from a carrier and compared against a consignee alias database to identify packages that are inbound to the consignee location, and a consignee location table is updated that monitors the status and anticipated delivery date of all packages inbound to the consignee location.

BRIEF DESCRIPTION OF THE FIGURES

FIGS. 2A-2C illustrate a consignee alias address database in accordance with an embodiment of the present invention.

FIGS. 7A-7E are screen shots that depict a user interface of a web-enabled inbound package tracking system.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
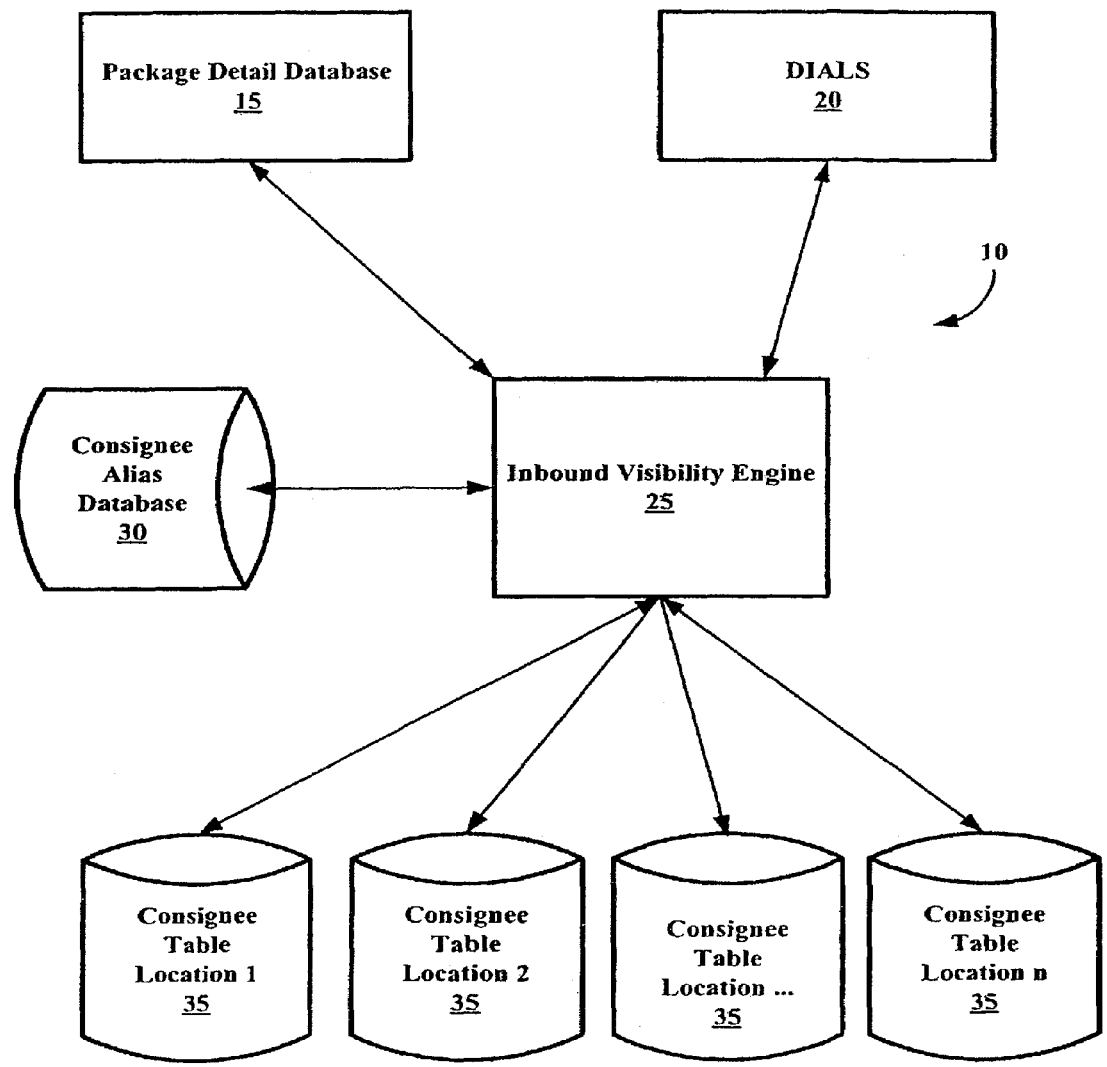
FIG. 1 is a high-level block diagram of an inbound package tracking system in accordance with an embodiment of the present invention.

FIG. 1 is a high-level block diagram of an inbound package tracking system 10 in accordance with an embodiment of the present invention that includes a package detail database 15, a delivery information automated lookup system (DIALS) database 20, an inbound visibility engine 25, a consignee address alias database 30 and a consignee table 35 for one or more consignee locations.

In a preferred embodiment, the package detail database 15 provides a complete picture of every package that is moving through a carrier system. Various types of records can be found in the package detail database including, without limitation, a manifest, an origin scan, a destination scan and a delivery record. In general, the manifest record contains the information provided to the carrier by the shipper when the package is shipped, including a consignee address, a shipper identifier, a package tracking number, a service level, one or more user-defined reference fields and a package weight. Additional fields are present in the manifest record and are well known to one of ordinary skill in the art. In a preferred embodiment, the manifest record is the only type of record in the package detail database 15 that includes a consignee address field; therefore, if a value is present in the consignee address field, the record is identifiable as a manifest.

The package level detail database 15 also includes records that track the movement of the package in the carrier system. In a preferred embodiment, an origin scan record is generated when the package is received into the carrier system. For example, a driver who collects a package from a shipper may scan a barcode on a shipping label affixed to a package and thereby generate a package scan record. Alternatively, an origin scan record might be generated at a designated carrier drop-off facility if a shipper elects to deliver a package to the carrier rather than having it collected. In general, an origin scan record is generated at the time that the carrier first receives a package or shortly thereafter and serves as a record of the point at which the package entered the carrier system.

Additional record types are generated as the package moves through the carrier system. In preferred embodiment, a new record is generated for the package detail database 15 every time the shipping label of the package is scanned as the package moves through the various carrier hubs and sortation facilities on its way to the consignee. In addition, a destination record is generated when the package arrives at the final hub and is about to be placed on a truck for delivery. Further, a delivery scan record is preferably present that details, among other things, the date and time the package is delivered to the consignee address.

In a preferred embodiment, each of these record types includes a unique tracking number that is associated with the package, and that provides an index by which all of the records associated with a particular package may be accessed. Thus, by querying the package detail database 15 with the package tracking number, a user can obtain those records associated with a particular package and in so doing see a complete history of the package as it moves through the carrier system.

Returning again to FIG. 1, the DIALS database 20 contains information obtained by a driver when he or she physically delivers the package. The records in the DIALS database 20 are preferably indexed with the package tracking number to allow the system to cross-index the DIALS data against the package detail history stored in the package detail database 15. Thus, when a package is delivered to a particular location and the DIALS database 20 updated with the delivery information, the package tracking number of a delivered package can be cross-referenced against the package detail database 15 to obtain the manifest record for the delivered package. In this way, the consignee address used by the shipper when the package was shipped, which is preferably present in the manifest record, is associated with the location where the package is delivered.

The operation of the inbound visibility engine 25 component of the inbound package tracking system 10 is described in greater detail below. At a high level, the function of the inbound visibility engine 10 is to analyze the records from the package detail database 15 and the DIALS database 20 in order to identify the packages bound for one or more locations that are associated with a particular consignee, and to report to the consignee the status and forecasted delivery time for each of those identified packages.

The function of the various components of the inbound package visibility system 10 are described herein in the context of an example. For purposes of illustration, an inbound package tracking system 10 is described herein for the entity Amazon.com and, more particularly, a system is described that is configured to provide inbound package tracking information for five separate locations, representing five warehouses or other receiving locations, that are associated with Amazon.com. This example is for illustrative purposes, however, and should not be interpreted as limiting the invention. One of ordinary skill in the art will readily recognize that the systems and methods described herein encompass inbound tracking methodologies that are capable of tracking packages for a plurality of consignees, each with one or more associated receiving locations.

Returning again to FIG. 1, the inbound package tracking system 10 includes a consignee address alias database 30 that has a table that lists the address, and any alias addresses, for each of the locations associated with a consignee. The following paragraphs describe a process in accordance with the present invention to identify alias addresses for a particular location.

In a first embodiment, the DIALS database 20 is queried to identify all of the shippers that have shipped a package to a particular consignee during a particular time period. To use the Amazon example, the DIALS database 20 is queried in order to identify every shipper that has shipped to any one of the five Amazon receiving locations during a predetermined period of time (i.e. a week, a month, or a year). Depending on the number of identified shippers, the list may be presented to the consignee and the consignee may be tasked with identifying only those shippers from which the consignee desires inbound package tracking. Alternatively, the entire list of shippers can be used to populate the consignee address alias database 30.

Once the shippers are identified, the next step is to identify packages that were sent to the consignee by the identified shippers. This is done by querying the DIALS database 20 with the shipper numbers to obtain the package tracking numbers for packages that were delivered to the consignee.

These package tracking numbers are then cross-referenced against the package detail database 15 to obtain the original manifest for the packages, and from this manifest the consignee address that the shipper used to ship the package is captured.

In a preferred embodiment, each consignee address captured represents a shipping address that was placed on a package label that resulted in the package being successfully delivered to one of the locations associated with the consignee. This does not necessarily mean that the shipping address used by the shipper is the correct address of a location associated with the consignee. Rather, it means that when the carrier received the shipping address, the carrier had sufficient information to conclude that the package was intended for a location associated with the consignee.

To illustrate, we will assume that a shipment receiving location associated with a particular consignee is located at the corner of Main Street and Maple Road. We assume further that the correct postal address of this location is 123 Maple Street, but that at some point in the past the correct postal address had been 456 Main Street. Many times, a change of address like that illustrated in this example is not recognized by vendors who ship to the address. For example, assume that a first vendor is a long time supplier of the consignee and has 456 Main Street entered into its shipping system as the address of the consignee. This first vendor may continue to use the 456 Main Street address even after the address is officially changed to 123 Maple Street. The consignee may continue to receive packages that are shipped from this vendor either because the carrier recognizes that the vendor has not updated its shipping system with the new address and/or because the carrier has designated the 456 Main Street address as an alias address for 123 Maple Street. In either case, the DIALS database 20 will reflect that packages bearing the 456 Main Street address were delivered to the 123 Maple Street location.

To continue with this example, we will assume that a second vendor began supplying and shipping goods to the consignee after the address of the consignee location was changed to 123 Maple Street. Unfortunately, the second vendor made an error when it entered the address of the consignee into its shipping system, and instead of entering 123 Maple Street, the second vendor entered the consignee's address as 123 Mable Street. Notwithstanding this error, the carrier is able to deliver the package to the correct consignee location because the carrier recognizes that there is no 123 Mable Street at the indicated zip code, and determines further from the consignee name and zip code listed on the shipping label that the package was actually intended for 123 Maple Street. Thus, even though the second vendor has an incorrect address in its shipping system, packages sent by this vendor are nevertheless delivered to the consignee location. In a preferred embodiment, data from the DIALS database 20 will indicate that packages shipped from the second vendor were delivered to the consignee location, and a cross reference of package tracking numbers will show that packages from the second vendor that bore a consignee address of 123 Mable Street were delivered to 123 Maple Street.

Other examples of situations by which misaddressed packages are delivered to the correct consignee address will be readily apparent to one of ordinary skill in the art. In many cases, the difference between the address on the shipping label and the correct postal address is not as drastic as in the examples discussed above. For example, the shipper may have too many spaces between two words in the address (i.e. too many spaces between "Maple" and "Street") or an address may use the wrong term (i.e. 123 Maple Road instead of 123 Maple Street). And although the address entered by the shipper is not an exact match of the correct consignee address, the carrier will deliver the package to the intended location. In many case, the carrier will notify the shipper of the error in the shipping address so that the correct shipping address is used in the future. But in many cases the shipper will not change its shipping system if the packages are being delivered to the intended recipient.

The consignee address alias database 30 of the present invention contains a list of addresses that have been used by the identified shippers to ship packages to one or more locations associated with a particular consignee. In either a manual or an automated process, the package tracking numbers of packages that were delivered to a consignee location are obtained from the DIALS database 20. These tracking numbers are cross-referenced against the manifest record of the package detail database 15 to obtain the address that the shipper used to identify the consignee address. An address alias database 30 is thus created that includes the addresses, including any aliases and/or misspelled addresses that the shippers used to send packages to one or more of the consignee locations. In a preferred embodiment, a single address alias database 30 is used for each consignee. But one of ordinary skill in the art will readily recognize that a separate alias database can be maintained for each location associated with a given consignee, or alternatively, a single address alias database can be maintained for a plurality of consignees.

FIGS. 2A-2C illustrate a consignee alias address database 30 in accordance with an embodiment of the present invention. The alias address database 30 shown in the figure illustrates a database that could be used to identify packages that are inbound to the five locations associated with the Amazon.com consignee described in the example above. In these figures, the left-most column lists the five Amazon.com locations: Campbellsville, Ky.; Coffeyville, Kans.; Fernley Nev., Lexington, Ky. and NewCastle, Del. The next four columns show the various combinations of consignee name, address, city, state and postal code that are used by the system 10 to identify packages bound for the five Amazon locations. These figures also illustrate several ways in which two or more shippers can use different abbreviations and naming standards to label packages bound for the same location. As described below, the inbound tracking system 10 of the present invention compares actual destination addresses against each of these variations in determining whether a package is bound for a particular location.

Returning again to the block diagram of FIG. 1, a plurality of consignee tables 35 are illustrated. As discussed below, the consignee tables 35 are used to store information about packages that are inbound to locations associated with a consignee. In a preferred embodiment, each location associated with a consignee has a unique consignee table 35. But one of ordinary skill in the art will recognize that a single consignee table can be maintained for a plurality of locations, or even for a plurality of consignees.

Figure 3:
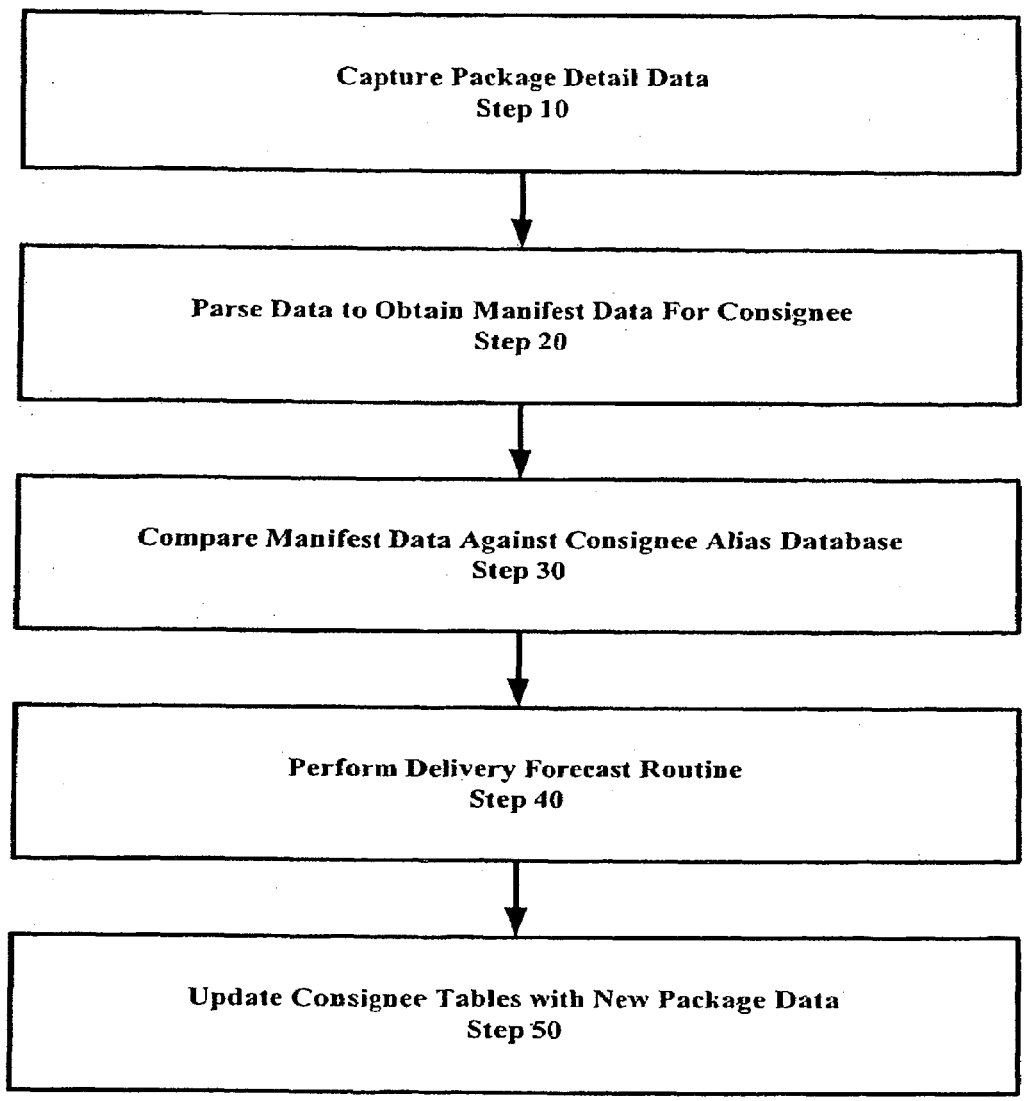
FIG. 3 is a flow chart that illustrates the operation of a inbound package tracking system 10 in accordance with an embodiment of the present invention.

FIG. 3 is a flow chart that illustrates the operation of a inbound package tracking system 10 in accordance with an embodiment of the present invention. In Step 10, the inbound visibility engine 25 captures package detail data from the package detail database 15. As described above, the package detail database 15 preferably includes several different types of records. In Step 20, the visibility engine 25 parses the various records to capture those records that contain package manifest information. In a preferred embodiment, the manifest record is the only record type that has a value in the consignee address field, and the visibility engine 25 parses the database by capturing those records with consignee address data.

In Step 30, the visibility engine 25 compares the consignee address data from the manifest record against the consignee address alias database 30 to determine whether the package is being shipped to one of the consignee locations or to a known alias address of one of the consignee locations. One of ordinary skill in the art will readily recognize that not every manifest record in a carrier system needs to compared against the address alias database 30. With a large carrier, such as UPS, the overhead associated with matching every package manifest record against one or more alias databases 30 would be considerable. To streamline the inbound tracking process, one or more filters are preferably established to limit the number of records that the visibility engine 25 processes. For example, the system 10 may reject any manifest records that do not have a consignee zip code that matches the zip code of at least one of the identified consignee locations. Alternatively, or in addition to the zip code filter, the system 10 may reject all manifest records that does not identify the consignee in the consignee field.

With reference to the Amazon.com example, the inbound tracking system 10 of the present invention may reject any manifest record received from the package detail database 15 that does not have a destination zip code that matches a zip code of one of the five warehouses or other locations that we previously established as being associated with Amazon.com. In addition, the system 10 may also reject any manifest record that does not include the string "Amazon" somewhere in the consignee field of the manifest record. In a preferred embodiment, records received from the detail database 15 that do not include one of the five identified zip codes and that do not include the string Amazon in the consignee field are rejected by the visibility engine 25 and are not processed against the address alias database 30.

Another potential filter that can be employed in the systems and methods of present invention is a shipper identifier. In some cases, a consignee may elect to only track packages that are shipped from select shippers. In such case, the shipper identifier may be used as a filter to eliminate package detail records that do not relate to one of the selected shippers. In another embodiment, individual shippers may be given the choice of whether to have their packages processed by the inbound tracking system 10 and the shipper identifier can be used to eliminate records of shippers that opt out of the process.

It will be apparent to one of ordinary skill in the art that an intent of the data filters discussed above is to streamline the data processing function of the visibility engine 25. The shipper identifier, zip code and consignee string filters described above are intended to be illustrative and it will be obvious that other data filters can be used in conjunction with the present invention to streamline the processing. Moreover, while the visibility engine 25 is described as having responsibility for performing the data filtering function, it would be equally advantageous to have the data filter function performed by the package detail database 15 or by another component of a carrier system at a different stage in the process.

In Step 30 manifest records are filtered by the system and compared against the consignee address alias database 30. If the consignee address of the manifest record matches the address of one of the consignee locations or matches one of the known alias addresses listed in the database 30, then the visibility engine 25 flags the record as inbound to one of the consignee locations. In one embodiment, the destination address, city, state and postal code are all compared against the records of the address alias database 30. In an alternate embodiment, the consignee name is also used as a matching criteria. But in still other embodiments of the present invention only a portion of the consignee address (i.e. the street address or address one field) is matched against the alias database 30. One of ordinary skill will readily recognize that various combinations of address fields can be used with the present invention to match the manifest data against the alias database 30.

In Step 40, the shipping detail from the manifest records that are identified as bound for one of the consignee locations is captured and passed to a forecasting routine, which determines when the package is scheduled to be delivered. Forecasting routines such as that used in Step 40 are well known in the art. In general, shipping information such as the origination address, destination address and service level are compared against one or more carrier tables to determine the route that will be used to move the package through the carrier system and the day on which it will be delivered.

In Step 50, the consignee tables 35 are updated with the shipping detail about the packages that are flagged as inbound to the consignee. In a preferred embodiment, a separate consignee table 35 is established for each location and each table is updated with the shipping detail for packages bound to that particular location. Also in a preferred embodiment, the forecasted delivery date and package tracking number for the package is part of the shipping detail added to the consignee tables 35. But one of ordinary skill in the art will readily recognize, that a single consignee table 35 can be used to store data for a plurality of consignee locations and that delivery forecast information may or may not be part of the data stored in table 35.

The foregoing steps describe the process by which one or more consignee tables 35 associated with a consignee may be updated with the manifest record information for new packages. The following paragraphs describe a process by which existing records in the consignee tables 35 are updated with new package status information.

Figure 4:
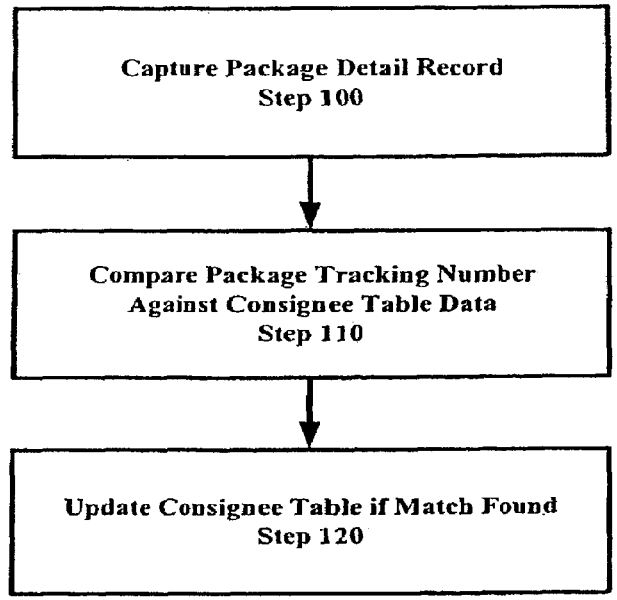
FIG. 4 is flow chart that shows a process for updating a consignee table with package status information in accordance with an embodiment of the present invention.

FIG. 4 is a flow chart that illustrates the steps used to update existing records in the consignee tables 35 with package status information. In a preferred embodiment, the process flow illustrated in FIG. 4 is performed immediately after the process flow of FIG. 3. But one of ordinary skill will recognize that the two processes can be performed independently of one another and at different intervals. In general, the process illustrated in FIG. 3 uses manifest records from the package detail database 15 to identify new records to be added to the consignee table 35. In contrast, the process of FIG. 4 uses the other record types (origin scans, destination scans, delivery records, etc.) from the package detail database 15 to update the, package status information for existing records of the consignee table 35.

In Step 100, the inbound visibility engine 25 captures package detail data from the package detail database. In one embodiment, the package detail database 15 is a carrier database that is updated on a predetermined frequency, such as once per hour, with information about packages in transit that the carrier has collected since the last update. In an alternate embodiment, the carrier updates the package detail database 15 in near real-time and the visibility engine 25 wakes up at predetermined times to access the database 15 and update the consignee tables 35 with package status changes that occurred since the last update. In still another embodiment, the detail database 15 and visibility engines 25 each operate in near real-time and the consignee tables 35 are continuously updated.

In Step 110, the package tracking number from the package detail records of the package detail database 15 is compared against the package tracking numbers used as indexes in the consignee tables 35. If a match is found, the consignee tables 35 are updated with the latest package status information. In a preferred embodiment, each entry in the consignee table 35 includes fields for specific package tracking events such as manifest, origin scan, destination scan and delivery. As a package moves through a carrier system, the package is scanned at several points in the system for traditional package tracking purposes and the results of these scans are made available to the inbound package tracking system 10 through the package detail database 15. The consignee table records are then updated whenever a package tracking event occurs. Thus, in a preferred embodiment, the consignee table 35 includes a list of packages that are bound for a given location and provides a history of the movement of each package through the carrier system.

The processes described above show how the address alias database 30 is created and how the database 30 can be used in an inbound tracking system 10 to generate a table of packages bound for one or more locations. The following paragraphs describe a process through which new alias addresses are identified and added to the address alias database 30.

Figure 5:
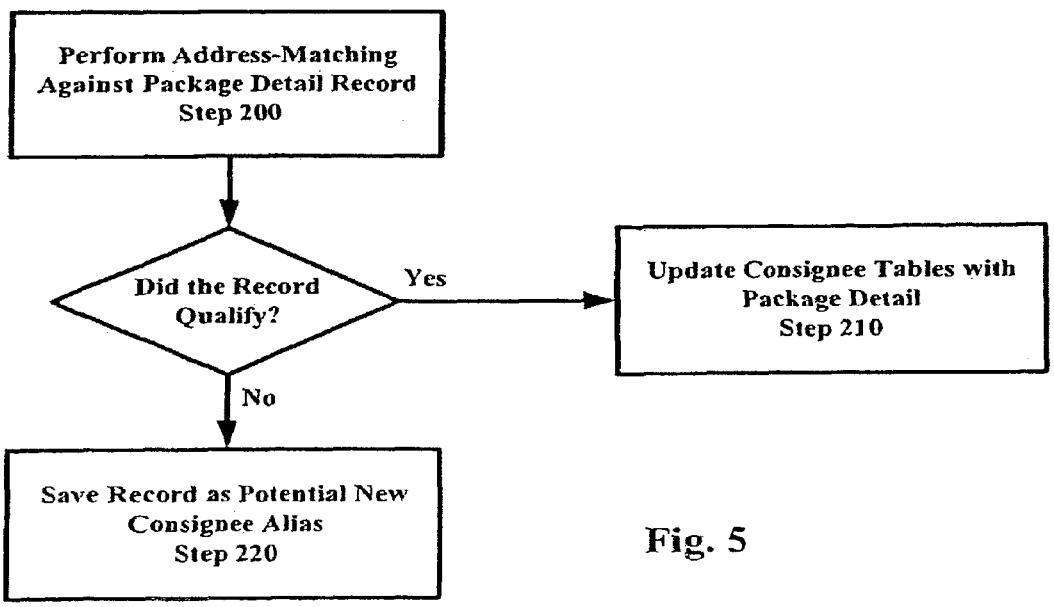
FIG. 5 is a flow chart that describes a process through which manifest records that do not match the data in an address alias database are identified and marked for later processing as potential new consignee aliases.

FIG. 5 is flow chart that describes a process through which manifest records that do not match the data in the address alias database 30 are stored for later processing as potential new alias addresses. In Step 200, consignee address and/or name fields from the package manifest record from the package detail database 15 are compared against the address alias database 30 to determine if the package is bound for a consignee location. If the record qualifies, meaning that the consignee data in the manifest record matches the qualifying consignee data from alias database 30, then the process proceeds to Step 210 and a new record is added to the consignee table 35. But if the record does not qualify, meaning that the data in the manifest record does not match the appropriate data fields of the address alias database 30, then the process proceeds to Step 220 and the record is stored in a no-match file 40.

Figure 6:
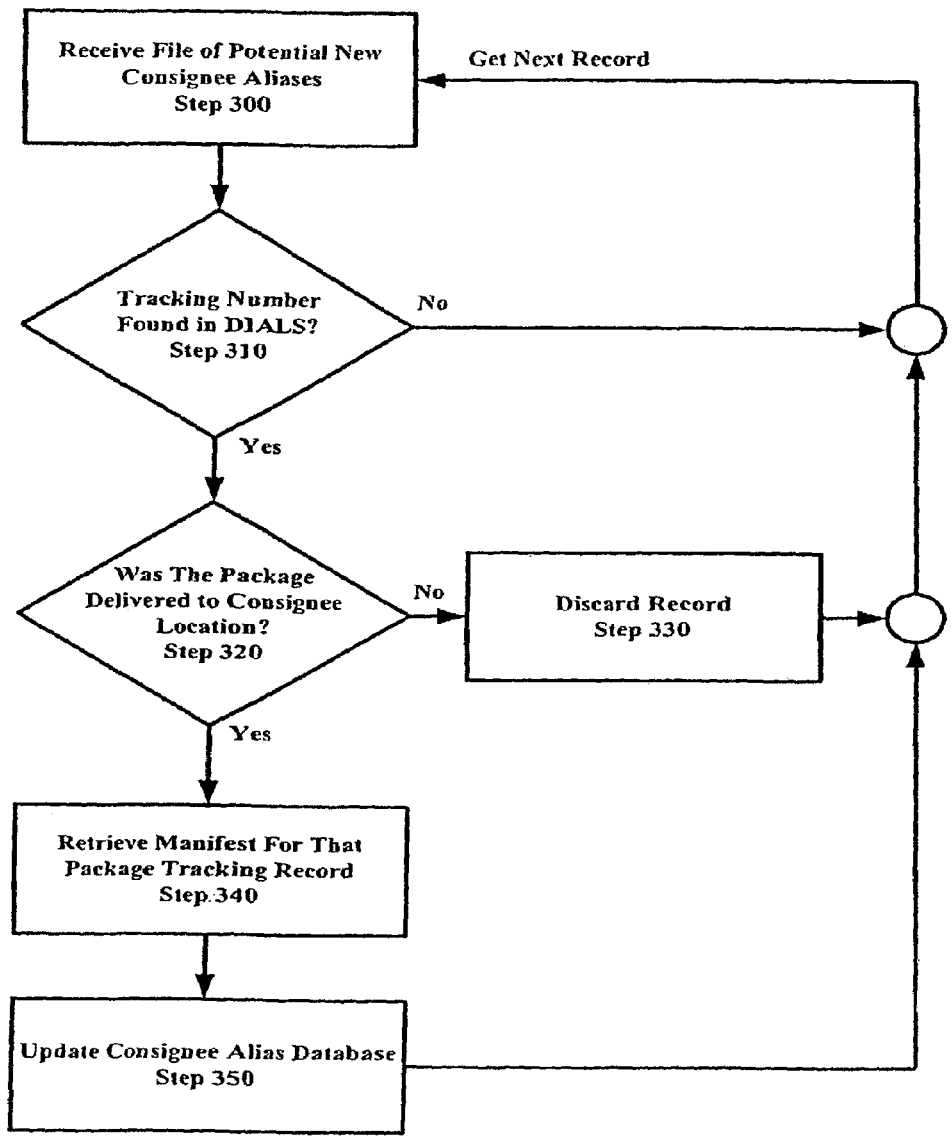
FIG. 6 illustrates the process through which non-matching records are processed as potential new consignee aliases.

FIG. 6 illustrates the process through which the records in the no-match file are examined to determine if the consignee information contained in the records should be added to the address alias database 30. In Step 300, a record of the no-match file 40 is read into the inbound visibility engine 25. One of ordinary skill, however, will recognize that although the processes described in the following paragraphs are attributed to the visibility engine 25, these functions may be performed by any component of the inbound package tracking system 10 or by an entirely separate system.

In Step 310, the package tracking number of the no-match record is compared against the DIALS database 20 to determine if the package has been delivered. If a match is found against the DIALS data, then a determination is made that the package has been delivered and the process proceeds to Step 320. But if the package tracking number does not find a match in the DIALS database 20, the process returns to Step 310 and the next no-match record is read.

In Step 320, the DIALS database 20 is queried to determine whether the package was delivered to the consignee. In a preferred embodiment, the no-match file 40 contain records that were not added to the consignee tables 35 and thus were not included in the inbound tracking information that is provided to the consignee. If a record in the no-match file 40 represents a package that in fact was delivered to the consignee then the alias address database 30 should be updated to include the consignee information stored in the no-match record. Thus, if the DIALS database 20 shows that the package was not delivered to the consignee, then the record is discarded (Step 330) and the process returns to Step 300 where the next no-match record is read. But if the DIALS database 20 shows that the package was delivered to the consignee, the process proceeds to Step 340.

At Step 340 a package has been delivered to the consignee, but the package shipping detail did not match the consignee location information in the address alias database 30. The next step then, is to update the address alias database 30 with the new consignee alias information from the package shipping detail and in Step 340 that information is captured. In a first embodiment, this information is captured from the original manifest record stored in the package detail database 15. But in an alternate embodiment, this information is already present in the records of the no-match file 40.

Once the necessary consignee detail is captured, the process proceeds to Step 350 and the address alias database 30 is updated with the new consignee information. Thus, if a new shipper starts to ship packages to a consignee and enters a unique combination of consignee name, address, city, state and/or postal code (or any other information used to match the package manifest record to the alias database 30), this process will recognize that a new alias has been used to identify a consignee and/or a consignee address and will update the alias database 30 accordingly. One of ordinary skill in the art will recognize that the systems and methods herein described work in part because shippers tend to use the same address each time a package is sent to a repeat consignee. In a preferred embodiment, the address alias database 30 becomes a repository of the consignee identifiers and addresses used by the shippers that frequently ship to the consignee. The foregoing processes also provide a dynamic that updates the alias database to add new aliases as new shippers begin shipping to the consignee. If the inbound package tracking system 10 does not match a consignee alias the first time that the shipper ships to the consignee, the alias database 30 is updated to match future shipments that use the same consignee information.

The following paragraphs describe a web-enabled inbound package tracking system in accordance with an embodiment of the present invention. In a preferred embodiment, the inbound package tracking system 10 resides on a carrier server and is accessed by one or more users via the Internet using a browser such as Internet Explorer.

FIGS. 7A-7E are screen shots that depict a user interface of a web-based inbound package tracking system 10 in accordance with an embodiment of the present invention. These figures continue to use the example in which five separate locations are associated with a single consignee, Amazon.com. One of ordinary skill in the art will readily recognize that the web pages described herein are for illustrative purposes and are not intended to limit the invention.

FIG. 7A shows a web page that a consignee might see which presents a summary of the packages inbound to the various location or locations associated with that consignee for a given date. The web page includes a pull-down date menu 100 that allows the consignee to view the packages inbound to the various consignee locations on any selected date. The various consignee location names and addresses are also listed on the web page and each consignee location is accompanied by fields for number of packages per location 105 and total package weight per location 110. In a preferred embodiment, the data used to populate these fields is obtained from the consignee tables 35, which include a forecast of the packages that are scheduled to be delivered to each consignee location on any given date. But one of ordinary skill will recognize that some or all of the data presented to the user may be obtained from other components of the inbound package tracking system 10. The web page also has a shipper view link 115 to another web page should the user elect to view the inbound tracking information by shipper identifier, and location links 120 that are associated with each consignee location.

Figure 7B:

If the user seeks additional information abound the inbound packages, the user can activate a location link 120 and obtain greater detail about the packages bound for each of the consignee locations. FIG. 7B shows a web page that the user receives when the location link 120 for the Campbellsville location is activated. In a preferred embodiment, this web page includes a shipper name field 125 that identifies which shippers sent the packages that are scheduled to be delivered on the selected date. Additional fields include three user-defined reference fields 130, a number of packages per shipper 135 from each shipper and a total package weight per shipper 140. In this example, 21 packages having a combined weight of 186 pounds are bound for the Campbellsville location and 19 of these packages were shipped from the Navarre Corporation. The user can obtain even more detail about inbound packages through a shipper name link 145 that provides the user with detail about each package that is bound to a selected location from a selected shipper.

FIGS. 7C and 7D show a web page that includes package level detail about packages inbound to a selected consignee location from a selected shipper. Information included in this example includes the location name, package tracking number, one reference number, a ship date, origin scan date, exception identifier, destination scan date, delivery scan date, service level indicator and package weight. In a preferred embodiment, this information can be populated from the consignee tables 35, but one of ordinary skill will recognize that some or all of this data may be pulled from other carrier databases that have package detail indexed by the package tracking number. Additional detail about specific packages is also available to the user through a package tracking link 150.

Figure 7E:

FIG. 7E shows a web page that provides package level detail about a specific package. In a preferred embodiment, the information available to the user at this web page mimics the information that a user can obtain using processes well known in the art to track a single package using a package tracking number. Information on this page may be populated from components of the inbound tracking system 10 discussed above or, alternatively, using carrier tracking systems and methods that are known in the art.

The inbound package tracking system 10, which comprises an ordered listing of selectable services can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Further, any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

In concluding the detailed description, it should be noted that it will be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

That which is claimed:

1. A method of tracking packages inbound to a consignee, said method comprising the steps of:
   providing a consignee table configured to receive and store shipping data;
   generating a consignee alias database for storing a plurality of data combinations, each data combination including a consignee alias name and a consignee alias address, wherein said step of generating a consignee alias database comprises:
   (a) identifying one or more packages shipped to said consignee during a predetermined period of time;
   (b) capturing a tracking number for each of said one or more packages;
   (c) querying a manifest database with said tracking number and retrieving stored shipping detail related to said tracking number, said stored shipping detail including a stored consignee name and a stored consignee address;
   (d) comparing said stored shipping data against said alias database; and
   (e) adding said stored shipping data to said consignee alias database if said stored shipping data includes a consignee name and consignee address not already stored in said consignee alias database;

capturing current shipping detail about a package in transit, said current shipping detail including a consignee name and a consignee address;

comparing said current shipping detail against said alias database; and updating said consignee table with said current shipping detail if said current shipping detail matches one of said plurality of data combinations.

2. The method of claim 1, further comprising the steps of:

forecasting an expected delivery date of said package; and updating said consignee table with said expected delivery date.

3. The method of claim 1, further comprising providing an updated delivery date based upon the consignee table.

4. The method of claim 1, wherein querying a manifest database with said tracking number comprises querying a package detail database.

5. The method of claim 1, wherein updating said consignee table with said current shipping detail if said current shipping detail matches one of said plurality of data combinations.

6. The method of claim 1, wherein providing a consignee table configured to receive and store shipping data comprises providing a consignee table for each of said one or more receiving locations.

* * * * *